(12) United States Patent
Robinson

(10) Patent No.: US 11,190,001 B2
(45) Date of Patent: Nov. 30, 2021

(54) COVER ASSEMBLY FOR A GROUNDING ARRANGEMENT

(71) Applicant: EATON INTELLIGENT POWER LIMITED, Dublin (IE)

(72) Inventor: James D. Robinson, Greenwood, SC (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 20 days.

(21) Appl. No.: 16/728,262

(22) Filed: Dec. 27, 2019

(65) Prior Publication Data

US 2021/0098981 A1 Apr. 1, 2021

Related U.S. Application Data

(60) Provisional application No. 62/906,384, filed on Sep. 26, 2019.

(51) Int. Cl.
*H01R 4/66* (2006.01)
*H02G 15/04* (2006.01)

(52) U.S. Cl.
CPC ............. *H02G 15/043* (2013.01); *H01R 4/66* (2013.01)

(58) Field of Classification Search
CPC ................................ H02G 15/043; H01R 4/66
USPC .................................... 174/6, 74 R, 78, 84 R
See application file for complete search history.

(56) References Cited

U.S. PATENT DOCUMENTS 5,248,265 A * 9/1993 Goto .................. H01R 13/5213
439/559
5,842,891 A * 12/1998 Rebers ................ H02G 15/113
439/738

OTHER PUBLICATIONS

Chance Grounding Equipment Catalog 3000; Hubbell Power Systems, Inc.; www.hubbellpowersystem.com; Jul. 2018.
InsulBoot Catalog; Plastic Dip Moldings, Inc.; insulboot.com; 2011.
Ball Stud Cover; Catalog No. C4060416; Hubbell Power Systems, Inc.; Jul. 5, 2016.

* cited by examiner

*Primary Examiner* — William H. Mayo, III
(74) *Attorney, Agent, or Firm* — Squire Patton Boggs, US LLP

(57) ABSTRACT

A cover assembly for a grounding arrangement having a ground stud electrically connected to a conductive surface. The cover assembly includes a cable boot configured to enclose at least a part of the ground stud and the conductive surface. The cable boot has an aperture. The cover assembly further includes a plug boot is insertable into the aperture of the cable boot. The plug boot includes a stud receiving portion defining an interior space. At least a portion of the ground stud is received in the interior space when the plug boot is inserted into the aperture. A handle portion extends from the stud receiving portion.

20 Claims, 8 Drawing Sheets

COVER ASSEMBLY FOR A GROUNDING ARRANGEMENT

CROSS-REFERENCE TO RELATED APPLICATION

The present application claims the benefit of the filing date of U.S. Provisional Patent Application No. 62/906,384 filed on Sep. 26, 2019, the disclosure of which is incorporated herein in its entirety.

FIELD OF INVENTION

This disclosure relates to devices that cover and insulate electrical equipment. More specifically, this disclosure relates to a cover assembly for a grounding arrangement.

BACKGROUND

Grounding arrangements may be provided to electrical equipment as a safety precaution. A typical grounding arrangement may include a ground stud that is electrically connected to a conductive surface. When maintenance is performed on the electrical equipment, the equipment may be powered off and the ground stud of the grounding arrangement may be used to establish a grounding path for electricity should the equipment become inadvertently electrified. The ground stud may go unused during normal operation of the electrical equipment. When unused it may be desirable to cover the ground stud to shield the ground stud from dust and debris, and to reduce chances of the ground stud corroding.

For outdoor electrical equipment or other air insulated systems, it may not be necessary to use an insulated cover for a ground stud. However, for switchgears and certain other electrical systems, insulated covers may be desirable for ground studs. Indeed, insulation may be required by certain standards, such as the Institute of Electrical and Electronics Engineers (IEEE) standards.

The term "switchgear" refers to a combination of one or more electrical disconnect switches, fuses, or circuit breakers. Switchgears can be housed within a contained enclosure to isolate components or groups of components. Switchgears may be used for control and distribution of medium voltage circuits, main-main automatic transfer, main-tie-main automatic transfer, main service disconnect and switching, protection of transformers, motors, generators, feeder circuits, and capacitor banks.

While it is known to provide covers for ground studs, known covers may not meet standards set forth by the IEEE. For example, known ground stud covers may not meet IEEE Standard C37.20.2™.

SUMMARY OF THE INVENTION

In one embodiment, a cover assembly for a grounding arrangement having a ground stud electrically connected to a conductive surface. The cover assembly includes a cable boot configured to enclose at least a part of the ground stud and the conductive surface. The cable boot has an aperture. The cover assembly further includes a plug boot that is insertable into the aperture of the cable boot. The plug boot includes a stud receiving portion defining an interior space. At least a portion of the ground stud is received in the interior space when the plug boot is inserted into the aperture. A handle portion extends from the stud receiving portion. The plug boot is free from contact with the ground stud when the portion of the ground stud is received in the interior space such that an air gap exists between the plug boot and the ground stud.

In another embodiment, a cover assembly for a grounding arrangement having a ground stud electrically connected to a conductive surface. The cover assembly includes a cable boot configured to enclose at least part of the ground stud and the conductive surface. The cable boot includes at least one side having an aperture therethrough. The cable boot further includes stabilizing projections arranged to sandwich the conductive surface. The cover assembly further includes a plug boot that is insertable into the aperture of the cable boot. At least a portion of the ground stud is received in the plug boot when the plug boot is inserted into the aperture. The stabilizing projections are configured to reduce movement of the cable boot relative to the ground arrangement during insertion of the plug boot into the aperture of the cable boot.

In yet another embodiment, a method of covering a grounding arrangement having a ground stud electrically connected to a conductive surface. The method includes enclosing at least part of the ground stud and the conductive surface with a cable boot, the cable boot having an aperture. A plug boot is inserted into the aperture of the cable boot, the plug boot defining an interior space in which at least a portion of the ground stud is received when the plug boot is inserted into the aperture. An air gap is maintained between the ground stud and the plug boot when the plug boot is inserted into the aperture such that the plug boot is free from contact with the ground stud.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
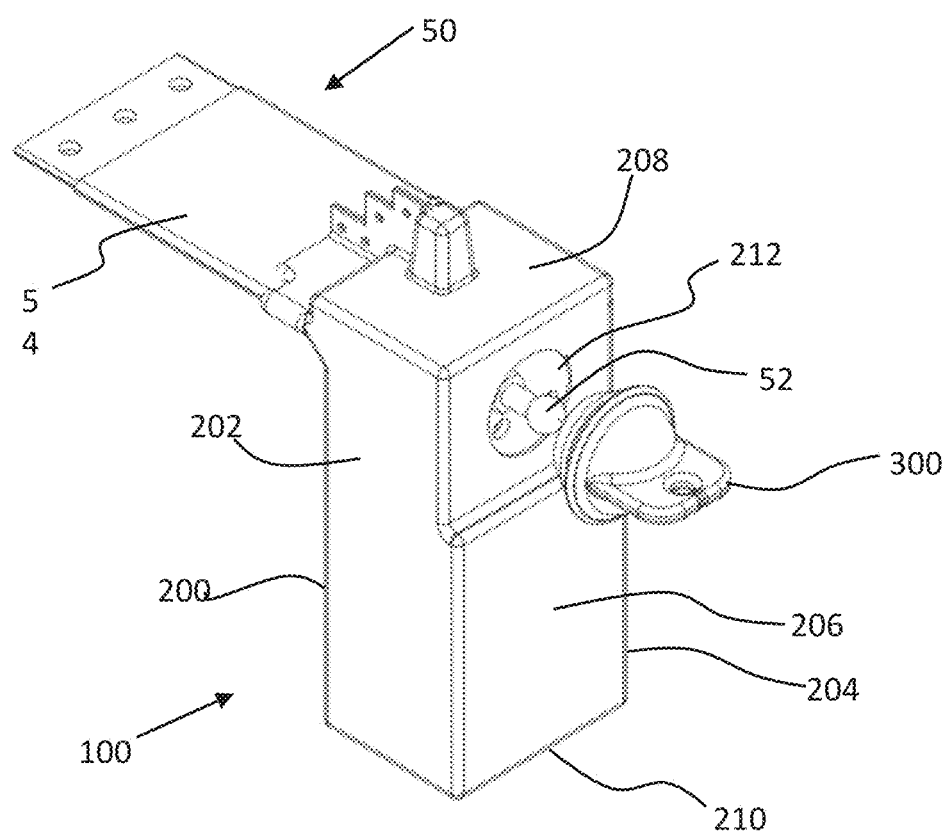
FIG. 1 is a perspective view of a cover assembly for a grounding arrangement, the cover assembly including one embodiment of a cable boot and one embodiment of a plug boot for use with the cable boot, the plug boot shown as being separated from the boot.
Figure 2:
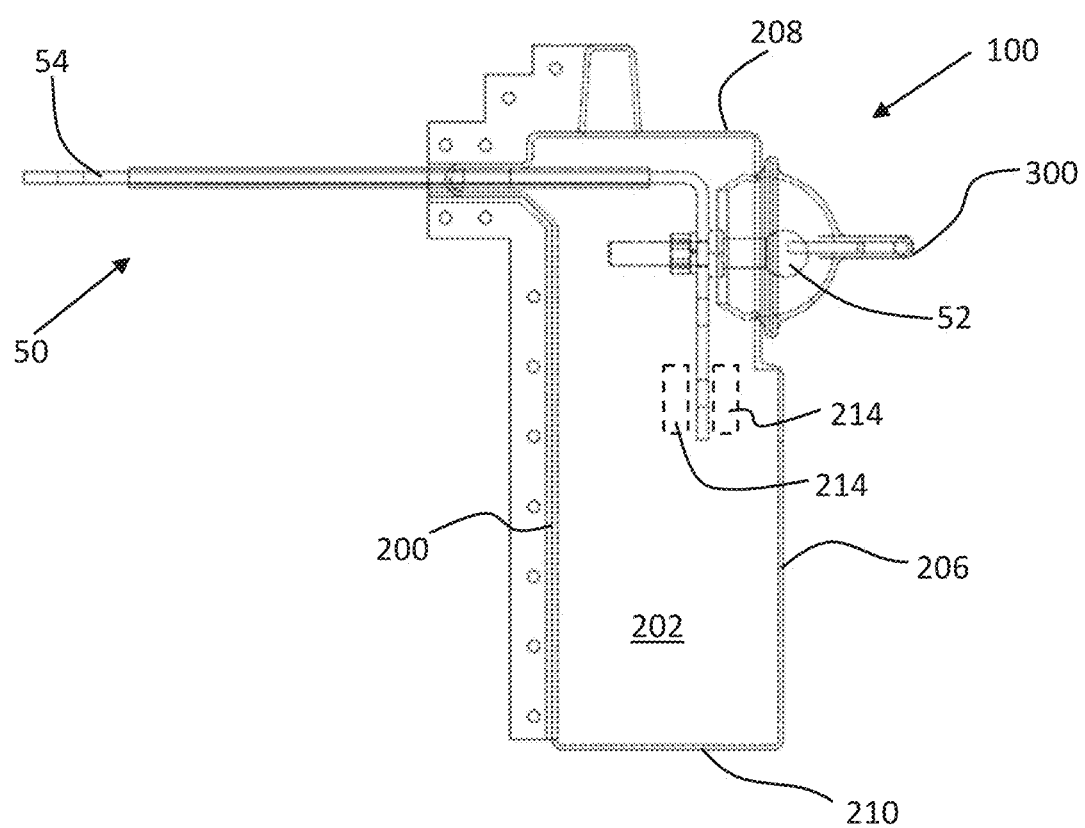
FIG. 2 is a side view of FIG. 1 showing the plug boot retained by the cable boot.
Figure 3:
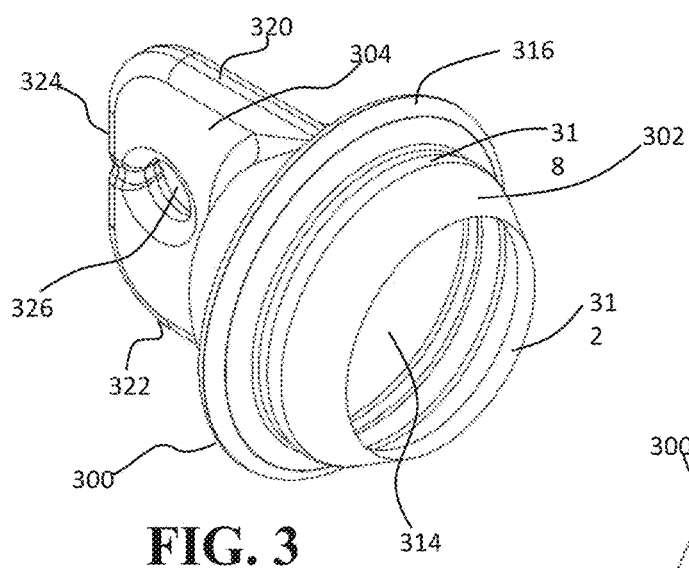
FIG. 3 is a perspective view of the plug boot of FIG. 1.
Figure 4:
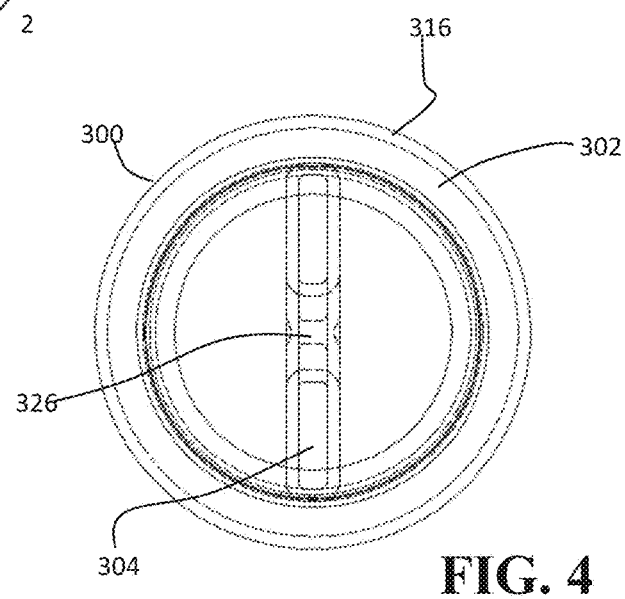
FIG. 4 is a front view of the plug boot of FIG. 1.

FIGS. 1 and 2 provide a perspective view and side view, respectively, of a cover assembly 100 for a grounding arrangement 50. In the illustrated embodiment, the grounding arrangement 50 includes a ground stud 52 and a conductive surface 54 to which the ground stud 52 is electrically connected. The ground stud 52 may be constructed of a conductive material (e.g., copper, steel, aluminum). The cover assembly 100 includes a cable boot 200 and a plug boot 300. The cable boot 200 or the plug boot 300 may be constructed of an insulating material (e.g., polyvinyl chloride, rubber).

FIGS. 1 and 2 show one example embodiment of the cable boot 200. The cable boot 200 is configured to substantially enclose at least part of the ground stud 52 and at least part of the conductive surface 54. In the illustrated embodiment, the cable boot 200 has a substantially rectangular cuboid shape and includes first and second minor sides 202, 204 and a major side 206. The first minor side 202, the second minor side 204, and the major side 206 each extend between a first end 208 and a second end 210 of the cable boot 200. A portion of the major side 206 is recessed toward the first end 208 of the cable boot 200. Stated otherwise, a portion of the major side 206 extends in a plane that is offset from a plane in which the remainder of the major side 206 extends. In alternative embodiments, the cable boot 200 may be provided as any desired shape so as to be able to enclose various grounding arrangement configurations. The cable boot 200 may be attached directly to the grounding arrangement 50, or may be attached to a component or surface on which the grounding arrangement 50 is directly or indirectly mounted.

The cable boot 200 includes an aperture 212 on the major side 206 toward the first end 208. In the illustrated embodiment, the aperture 212 is circular. In an alternative embodiment, the aperture 212 may be any desired shape. The aperture 212 is provided on the recessed portion of the major side 206. The aperture 212 is located such that the aperture 212 exposes the ground stud 52 when the cable boot 200 otherwise encloses the ground stud 52 and the conductive surface 54. In the illustrated embodiment, a part of the ground stud 52 extends through the aperture 212 beyond the cable boot 200. Stated otherwise, a part of the ground stud 52 is located outside the cable boot 200. In an alternative embodiment, the cable boot 200 may be arranged such that the ground stud 52 does not extend through the aperture 212 and the entire ground stud 52 is located inside the cable boot 200.

Stabilizing projections 214 extend inward from the first and second minor sides 202, 204. Each group of stabilizing projections 214 is configured to sandwich respective opposite edges of the conductive surface 54 when the cable boot 200 encloses the ground stud 52 and the conductive surface 54. Stated otherwise, one edge of the conductive surface 54 extends between the stabilizing projections 214 of the first minor side 202, and an opposite edge of the conductive surface 54 extends between the stabilizing projections 214 of the second minor side 204. The stabilizing projections 214 are arranged to be spaced from (i.e., not in contact with) the respective edge of the conductive surface 54 absent any external forces exerted on the cable boot 200.

The plug boot 300 (FIGS. 3-6) includes a stud receiving portion 302 and a handle portion 304. The plug boot 300 extends along a central axis 306 between a first end 308 and a second end 310.

In the illustrated embodiment, the stud receiving portion 302 has a bulbous-like shape. In alternative embodiments, the stud receiving portion 302 may be any desired shape. An opening 312 is provided on the stud receiving portion 302 at the first end 308 of the plug boot 300. In the illustrated embodiment, the opening 312 is substantially circular. In alternative embodiments, the opening 312 may by any desired shape. The opening 312 extends into an interior space 314 that is defined by the stud receiving portion 302.

A flange 316 extends circumferentially about the stud receiving portion 302. In the illustrated embodiment, the flange 316 is located along the central axis 306 toward the first end 308 of the plug boot 300 immediately adjacent the handle portion 304. In alternative embodiments, the flange 316 may be provided on the stud receiving portion 302 at any desired location along the central axis 306. A groove 318 extends circumferentially about the stud receiving portion 302. The groove 318 is provided adjacent the flange 316 toward the first end 308 of the stud receiving portion 302. The flange 316 and the groove 318 extend substantially parallel with one another.

The handle portion 304 includes first and second sides 320, 322 that extend from the stud receiving portion 302. The first and second sides 320, 322 each terminate at a common end face 324. The first and second sides 320, 322 extend substantially parallel with one another. The end face 324 extends substantially perpendicular to the first and second sides 320, 322. A hole 326 is provided on the handle portion 304. The hole 326 may receive a tag, connector, or any other desired accessory. In the illustrated embodiment, the hole 326 is located toward the end face 324 midway between the first side 320 and the second side 322. In alternative embodiments, the hole 326 may be provided at any desired location on the handle portion 304. In other alternative embodiments, the hole 326 may be omitted. The handle portion 304 may have a textured surface to facilitate gripping of the handle portion by an operator.

The plug boot 300 is configured to be retained by the cable boot 200 so as to cover the ground stud 52. Specifically, the stud receiving portion 302 of the plug boot 300 is dimensioned and configured to be inserted into the aperture 212 of the cable boot 200. When the plug boot 300 is inserted into the aperture 212 of the cable boot 200, the ground stud 52 is received in the cable boot 300.

To cover the ground stud 52, a user may manipulate the plug boot 300 by grasping the handle portion 304. While grasping the handle portion 304, the user presents the first end 308 of the stud receiving portion 302 to the aperture 212. The first end 308 of the stud receiving portion 302 is then inserted into the aperture 212. With the first end 308 inserted, the plug boot 300 is advanced toward the cable boot 200 until the flange 316 of the plug boot 300 comes into engagement with the major side 206 of the cable boot 200. A portion of the ground stud 52 is received in the interior space 314 of the stud receiving portion 302 when the flange 316 is in engagement with the major side 206. Thus, the plug boot 300 covers the ground stud 52.

Figure 5:
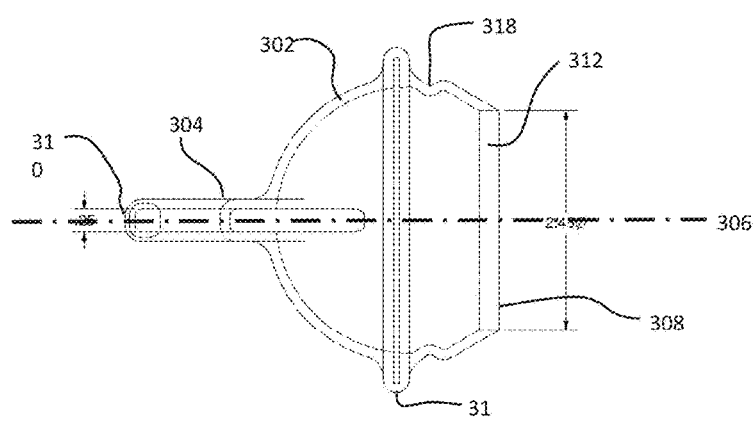
FIG. 5 is a top view of the plug boot lug of FIG. 1.
Figure 6:
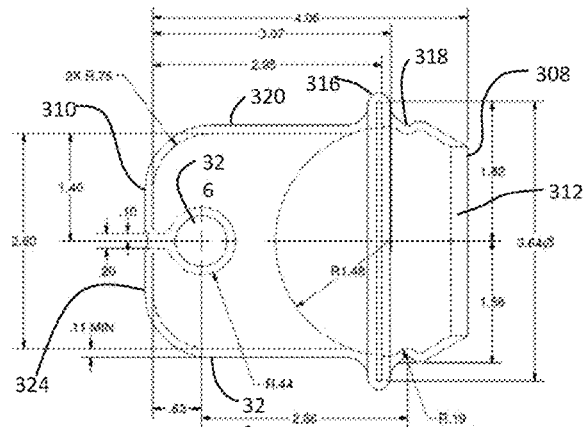
FIG. 6 is side view of the plug boot of FIG. 1.
Figure 7:
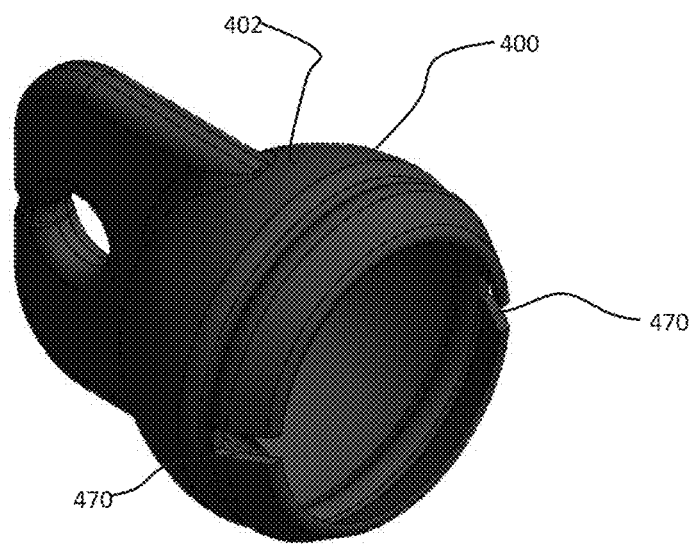
FIG. 7 is a perspective view of an alternative embodiment of a plug boot.
Figure 8:
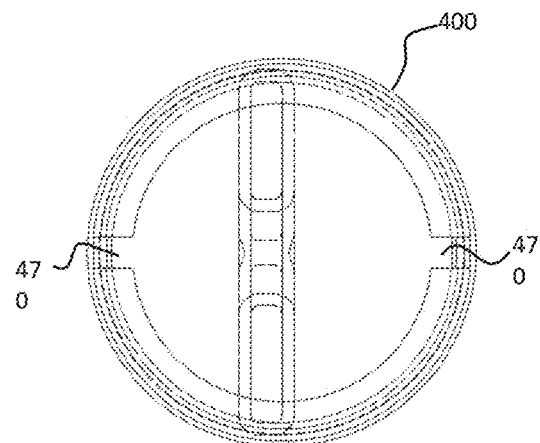
FIG. 8 is a front view of the plug boot of FIG. 7.

Additionally, when the flange 316 is in engagement with the major side 206, the groove 318 of the plug boot 300 is in engagement with a periphery 213 of the aperture 212 of the cable boot 200. This engagement reinforces the connection between the plug boot 300 and the cable boot 200 to reduce the possibility of accidental removal of the plug boot 300 from the aperture 212. The plug boot 300 or the cable boot 200 may be configured (i.e., dimensions, material selection) such that the plug boot 300 may be inserted and removed from the cable boot 200 by hand with moderate or minimal force. Furthermore, the plug boot 300 or the cable boot 200 may be configured such that the plug boot 300 is unlikely to disengage from the cable boot 300 or otherwise become unintentionally dislodged. The dimensions in FIGS. 5 and 6 are merely exemplary.

The stabilizing projections 214 provided on the cable boot 200 are configured to reduce movement or distortion of the cable boot 200 relative to the grounding arrangement 50 during the aforementioned process of inserting the plug boot 300 into the cable boot 200. Specifically, as the plug boot 300 is inserted and advanced into the cable boot 200, the cable boot 200 may move/distort until the stabilizing projections 214 come into contact with the conductive surface 54, at which point further movement of the cable boot 200 is substantially halted.

When it is desired to uncover the ground stud 52, a user may grasp the handle portion 304 and move the plug boot 300 away from the cable boot 200 until the stud receiving portion 302 is removed from the aperture 212. During this removal, the stabilizing projections 214 again reduce movement and distortion of the cable boot 200 relative to the grounding arrangement 50 in a similar fashion as described above during the insertion process.

The cable boot 200 and the plug boot 300 are configured such that, when the plug boot 300 is inserted into the aperture 212, an air gap is maintained between the ground stud 52 and the plug boot 300. In other words, the ground stud 52 is not in contact with any part of the plug boot 300 when the plug boot 300 is installed into the cable boot 200. This air gap substantially improves the ability of the cover assembly 100 in regard to electrically insulating the grounding arrangement 50. The cover assembly 100 can be contrasted with known ground stud covers, which rely on contact between the ground stud and the cover to retain the cover on the ground stud. In these known ground stud covers, the contact between the ground stud and the cover may substantially inhibit the ability of the cover to electrically insulate the ground stud.

In the illustrated embodiment, the size of the air gap is consistent. Stated otherwise, the end of the ground stud 52 is approximately equidistant from any point on the interior surface of the stud receiving portion 302 of the plug boot 300. In an alternative embodiment, the size of the air gap may be variable.

In one embodiment, the air gap is at least 1.25 inches (3.175 cm). Such an air gap may be desirable for 15,000 V applications. In alternative embodiments, any size air gap may be employed. For example, certain standards (such as IEEE standards) may require an air gap of a certain size based on the applied voltage or power rating of the system.

FIGS. 7-10 provide perspective, front, top, and side views, respectively, of an alternative embodiment of a plug boot 400. In this embodiment, the plug boot 400 is substantially the same as the plug boot 300 of FIGS. 3-6, except for the differences discussed herein. Like features shared between the plug boot 400 of FIGS. 7-10 and the plug boot 300 of FIGS. 3-6 will be identified by like numerals increased by a value of "100".

Figure 9:
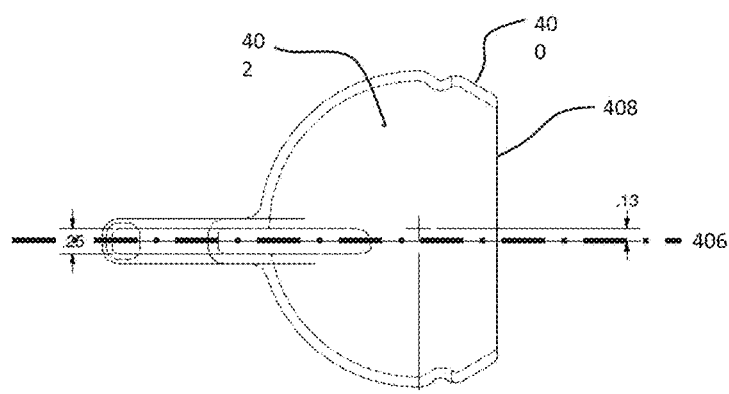
FIG. 9 is a top view of the plug boot of FIG. 7.
Figure 10:
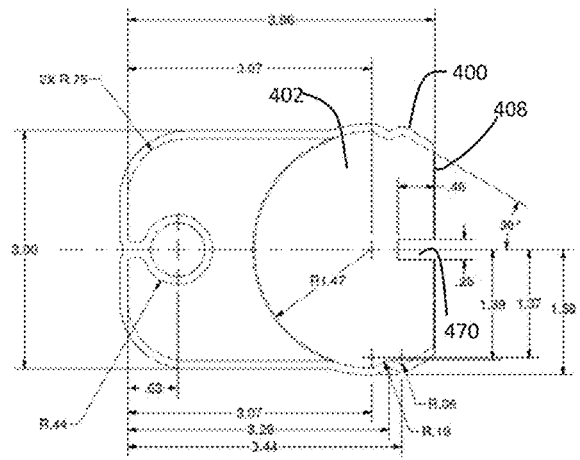
FIG. 10 is side view of the plug boot of FIG. 7.
Figure 11:
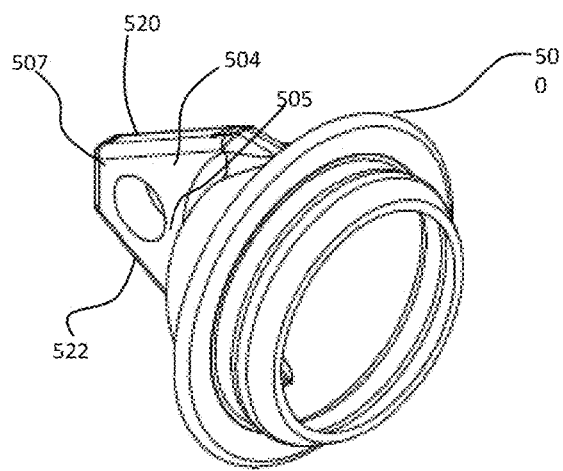
FIG. 11 is a perspective view of another alternative embodiment of a plug boot.
Figure 12:
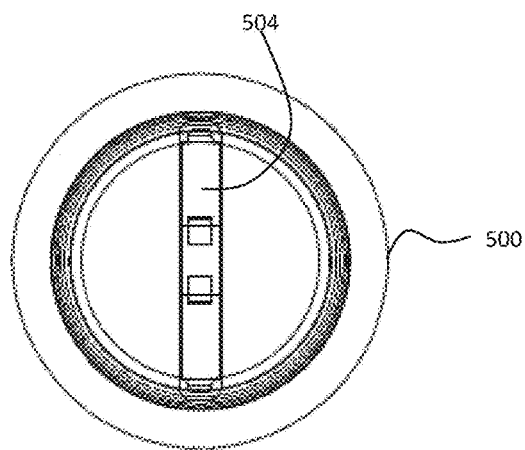
FIG. 12 is a front view of the plug boot of FIG. 11.
Figure 13:
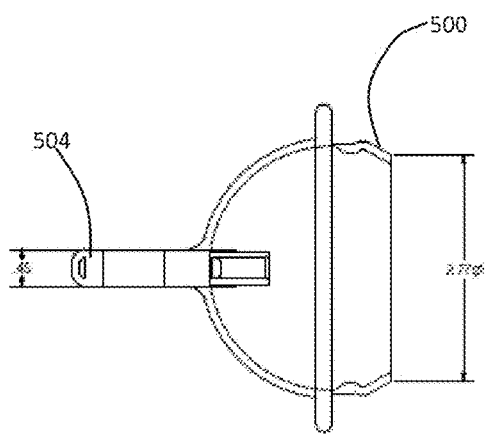
FIG. 13 is a top view of the plug boot of FIG. 11.
Figure 14:
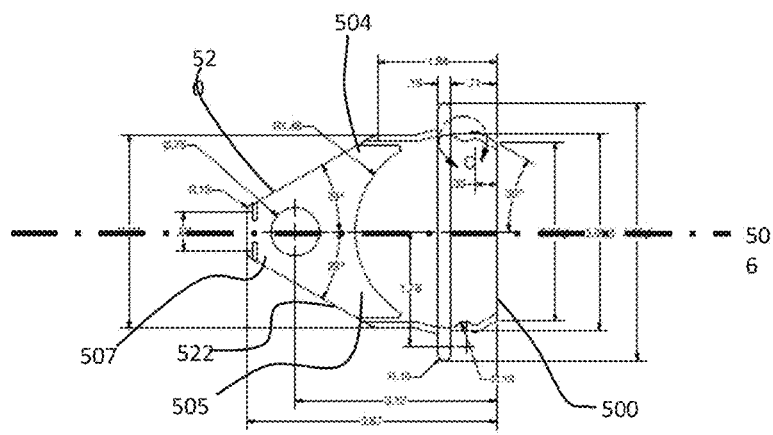
FIG. 14 is side view of the plug boot of FIG. 11.

In this embodiment, a pair of notches 470 are provided on the stud receiving portion 402 at the first end 408 of the plug boot 400. The notches 470 are provided on opposite sides of the longitudinal axis 406 of the plug boot 400. The notches 470 are configured to facilitate flexing of the stud receiving portion 402 as the plug boot 400 is inserted into the cable boot 200 or removed from the cable boot, thereby potentially reducing operator effort during the insertion or removal process. Additionally, in this embodiment, while the stud receiving portion 402 of the plug boot includes a circumferential groove 418, the stud receiving portion 402 lacks a circumferential flange. In an alternative embodiment, the notches 470 may be provided at any desired location at the first end 408 of the plug boot 400. In other alternative embodiments, the plug boot 400 may include a greater or fewer number of notches 470. The dimensions in FIGS. 9 and 10 are merely exemplary.

FIGS. 11-14 provide perspective, front, top, and side views, respectively of another alternative embodiment of a plug boot 500. In this embodiment, the plug boot 500 is substantially the same as the plug boot 300 of FIGS. 3-6, except for the differences discussed herein. Like features shared between the plug boot 500 of FIGS. 11-14 and the plug boot 300 of FIGS. 3-6 will be identified by like numerals increased by a value of "200".

In this embodiment, the handle portion 504 is tapered in a direction extending along the central axis 506 of the plug boot 500. More specifically, the first and second sides 520, 522 of the handle portion 504 are angled relative to one another such that the width of a proximal end 505 of the handle portion 504 is greater than the width of a distal end 507 of the handle portion 504. The taper of the handle portion 504 reduces the overall weight of the plug boot 500. Reducing the weight of the plug boot 500 may reduce the chance of the plug boot 500 becoming dislodged when the cover assembly is used in an environment that experiences high vibrations. In alternative embodiments, the handle portion 504 may be tapered such that the width of the proximal end 505 of the handle portion 504 is less than the width of the distal end 507 of the handle portion 504. In other alternative embodiments, the handle portion 504 may have any desired variation of widths along a direction of the central axis 506.

In other alternative embodiments, a plug boot may have any combination of features of the above described plug boots. For example, a plug boot may have a circumferential flange, a circumferential groove, notches, and a tapered handle. As another example, a plug boot may have a circumferential flange, notches, a tapered handle, and be free from a circumferential groove.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A cover assembly for a grounding arrangement having a ground stud electrically connected to a conductive surface, the cover assembly comprising:
   a cable boot configured to enclose at least a part of the ground stud and the conductive surface, the cable boot having an aperture; and
   a plug boot that is insertable into the aperture of the cable boot, the plug boot comprising:
      a stud receiving portion defining an interior space, at least a portion of the ground stud being received in the interior space when the plug boot is inserted into the aperture; and
      a handle portion extending from the stud receiving portion;
   wherein the plug boot is free from contact with the ground stud when the portion of the ground stud is received in the interior space such that an air gap exists between the plug boot and the ground stud.

2. The cover assembly of claim 1 wherein the plug boot includes a flange that extends circumferentially about the stud receiving portion, the flange engaging with the cable boot when the plug boot is inserted into the aperture of the cable boot.

3. The cover assembly of claim 1 wherein the plug boot includes a groove that extends circumferentially about the stud receiving portion, the groove engaging a periphery of the aperture when the plug boot is inserted into the aperture of the cable boot.

4. The cover assembly of claim 1 wherein the plug boot includes a flange that extends circumferentially about the stud receiving portion and a groove that extends circumferentially about the stud receiving portion, the groove being adjacent the flange.

5. The cover assembly of claim 1 wherein the plug boot includes notches on the stud receiving portion, the notches being configured to facilitate flexing of the stud receiving portion during insertion of the plug boot into the aperture of the cable boot.

6. The cover assembly of claim 1, wherein the handle portion of the plug boot is tapered in a direction extending along a central axis of the plug boot.

7. The cover assembly of claim 6, wherein the width of a proximal end of the handle portion is greater than the width of a distal end of the handle portion.

8. The cover assembly of claim 1 wherein the cable boot includes stabilizing projections arranged to sandwich the conductive surface, the stabilizing projections being configured to reduce movement of the cable boot relative to the grounding arrangement during insertion of the plug boot into the aperture of the cable boot.

9. The cover assembly of claim 1, wherein the handle portion has a hole extending therethrough.

10. The cover assembly of claim 1, wherein the cable boot and the plug boot are constructed of at least one of polyvinyl chloride and rubber.

11. A cover assembly for a grounding arrangement having a ground stud electrically connected to a conductive surface, the cover assembly comprising:
   a cable boot configured to enclose at least part of the ground stud and the conductive surface, the cable boot comprising:
      at least one side having an aperture therethrough; and
      stabilizing projections, the stabilizing projections being arranged to sandwich the conductive surface; and
   a plug boot that is insertable into the aperture of the cable boot, at least a portion of the ground stud being received in the plug boot when the plug boot is inserted into the aperture;
   wherein the stabilizing projections are configured to reduce movement of the cable boot relative to the ground arrangement during insertion of the plug boot into the aperture of the cable boot.

12. The cover assembly of claim 11 wherein the plug boot includes a flange that extends circumferentially about the stud receiving portion.

13. The cover assembly of claim 11 wherein the plug boot includes a groove that extends circumferentially about the stud receiving portion.

14. The cover assembly of claim 11 wherein the plug boot includes a flange and groove adjacent the flange, the flange and the groove each extending circumferentially about the stud receiving portion.

15. The cover assembly of claim 11 wherein the plug boot includes notches on the stud receiving portion.

16. The cover assembly of claim 11, wherein the handle portion of the plug boot is tapered.

17. The cover assembly of claim 16, wherein the width of a proximal end of the handle portion is greater than the width of a distal end of the handle portion.

18. The cover assembly of claim 11 wherein the plug boot is free from contact with the ground stud such that an air gap exists between the plug boot and the ground stud when the portion of the ground stud is received in the plug boot.

19. The cover assembly of claim 11 wherein the handle portion has a hole extending therethrough.

20. A method of covering a grounding arrangement having a ground stud electrically connected to a conductive surface, the method comprising the steps of:
   enclosing at least part of the ground stud and the conductive surface with a cable boot, the cable boot having an aperture;
   inserting a plug boot into the aperture of the cable boot, the plug boot defining an interior space in which at least a portion of the ground stud is received when the plug boot is inserted into the aperture; and
   maintaining an air gap between the ground stud and the plug boot when the plug boot is inserted into the aperture such that the plug boot is free from contact with the ground stud.

* * * * *